(12) United States Patent
Yamaguchi et al.

(10) Patent No.: US 7,355,641 B2
(45) Date of Patent: Apr. 8, 2008

(54) SOLID STATE IMAGING DEVICE READING NON-ADJACENT PIXELS OF THE SAME COLOR

(75) Inventors: Takumi Yamaguchi, Kyoto (JP); Shigetaka Kasuga, Hirakata (JP); Mitsuyoshi Mori, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 729 days.

(21) Appl. No.: 10/754,799

(22) Filed: Jan. 8, 2004

(65) Prior Publication Data

US 2004/0141073 A1    Jul. 22, 2004

(30) Foreign Application Priority Data

| Jan. 10, 2003 | (JP) | ............................. 2003-004856 |
| Jan. 15, 2003 | (JP) | ............................. 2003-007619 |
| Jan. 30, 2003 | (JP) | ............................. 2003-022727 |

(51) Int. Cl.
*H04N 3/14*    (2006.01)
*H04N 5/335*    (2006.01)

(52) U.S. Cl. ...................................... 348/273; 348/323

(58) Field of Classification Search ................ 348/273, 348/280, 283, 308, 312, 321, 323, 266, 268, 348/272, 281, 282, 294, 302, 305
See application file for complete search history.

(56) References Cited

U.S. PATENT DOCUMENTS 4,709,259 A * 11/1987 Suzuki ....................... 348/280
6,486,911 B1 * 11/2002 Denyer et al. .............. 348/308
6,522,356 B1 * 2/2003 Watanabe .................... 348/272
6,888,568 B1 * 5/2005 Neter ....................... 348/222.1
6,977,684 B1 * 12/2005 Hashimoto et al. ......... 384/294
6,992,714 B1    1/2006 Hashimoto et al.

FOREIGN PATENT DOCUMENTS

| JP | 8-154252 | 6/1996 |
| JP | 2000-12819 | 1/2000 |
| JP | 2001-36919 | 2/2001 |
| JP | 2001-045378 | 2/2001 |

* cited by examiner

*Primary Examiner*—Tuan Ho
*Assistant Examiner*—Timothy J Henn
(74) *Attorney, Agent, or Firm*—Hamre, Schumann, Mueller & Larson, P.C.

(57) ABSTRACT

A solid-state imaging device includes: an imaging portion in which a plurality of pixels for photoelectrically converting incident light are arranged so as to form a plural kinds of pixel lines having different color arrangements; a memory in which pixel signals obtained from the pixels of at least one line in the imaging portion are stored; an output signal line into which the pixel signals stored in the memory are read out; and an output portion from which signals of the output signal line are output. Pixel signals obtained from non-adjacent pixels of a first color in one line are read out into the output signal lines sequentially, and then pixel signals obtained from non-adjacent pixels of a second color are read out into the output signal lines sequentially. Pixel signals of the same color are output sequentially, so that it is not necessary to operate color selection switch for every pixel signals at high speed. Furthermore, it is possible to suppress the mixing of adjacent colors.

5 Claims, 8 Drawing Sheets

SOLID STATE IMAGING DEVICE READING NON-ADJACENT PIXELS OF THE SAME COLOR

FIELD OF THE INVENTION

The present invention relates to a solid-state imaging device in which pixels for photoelectrically converting incident light are arranged two-dimensionally, and a camera such as a digital still camera, a motion picture camera, and the like, using the solid-state imaging device.

BACKGROUND OF THE INVENTION

In a conventional solid-state imaging device used for a digital still camera, etc., pixel signals obtained from respective pixels for photoelectric conversion are transferred to and stored in a storage portion, for example, in each row, and then the pixel signals of each row are output sequentially in synchronization with readout pulses output from a horizontal shift resister (see, for example, FIGS. 13 and 14 of JP2001-45378A).

Figure 7:
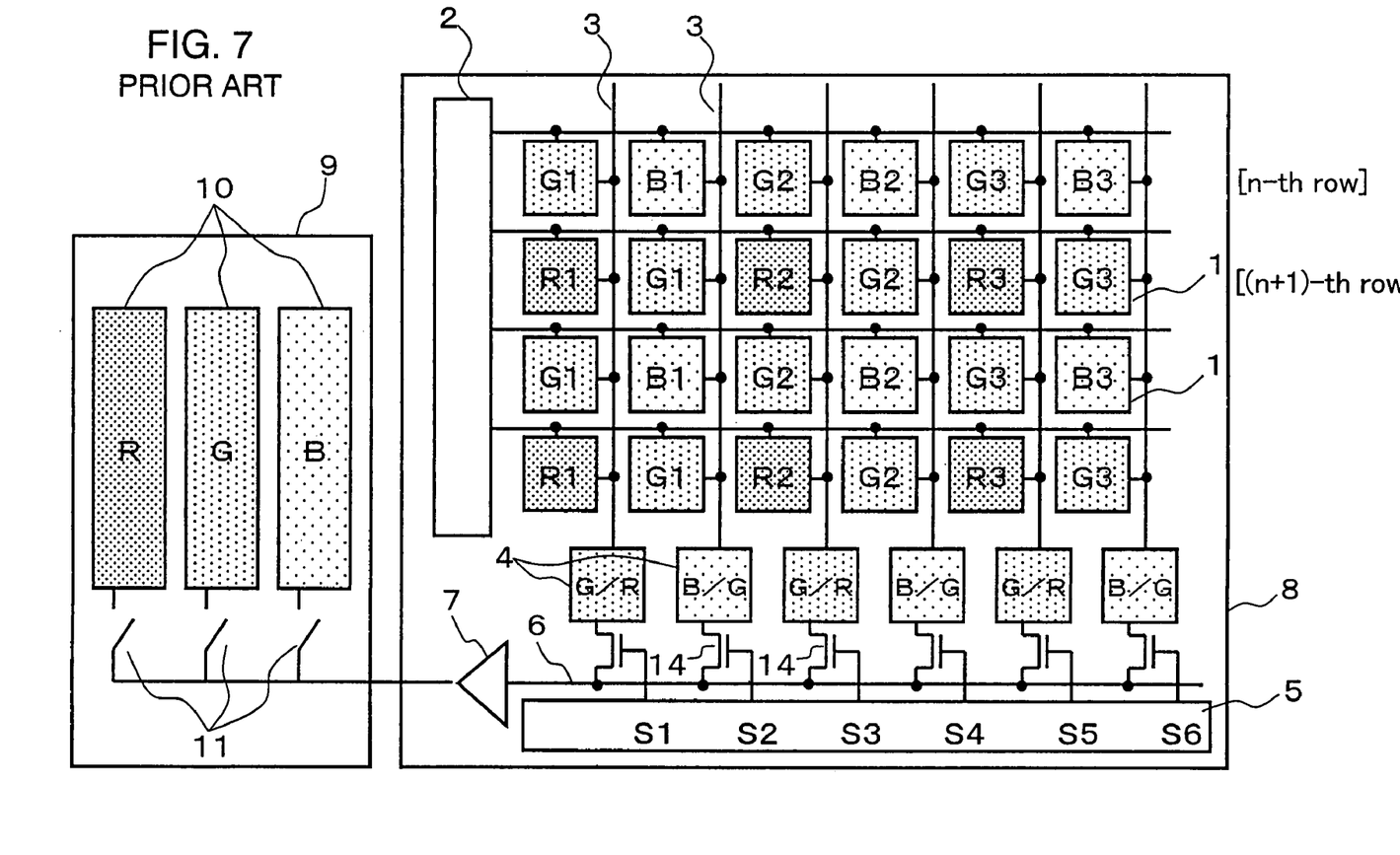
FIG. 7 is a view showing configurations of a MOS type solid-state imaging device and an external circuit according to a conventional example.

FIG. 7 shows configurations of a MOS type solid-state imaging device 8 (partially shown) and an external circuit 9 of a conventional example. The solid-state imaging device 8 includes a plurality of pixels 1 arranged two-dimensionally. Each pixel 1 is supplied with a selection signal for each row from a vertical shift resister 2. Vertical signal lines 3 in the direction of a column are connected to the pixels 1 of each column, respectively. Each vertical signal line 3 is connected to a row memory 4 in which signals in each row are stored. Each row memory 4 is respectively connected via a readout switch 14 to an output signal line 6 for outputting pixel signals of each row. The readout switch 14 is driven by an output of a horizontal shift resistor 5. The output signal line 6 is connected to an output amplifier 7 and the output therefrom is supplied to the external circuit 9. The external circuit 9 includes external memories 10 in which pixel signals output from the solid-state imaging device 8 are stored in each row and color selection switches 11.

In this solid-state imaging device 8, a plurality of pixels 1 are arranged in a Bayer arrangement of the three primary colors, red (R), green (G) and blue (B). Signals of the pixels 1 of each row are read out into the vertical signal line 3 in each row by the vertical shift resistor 2 and transferred to the row memory 4. The pixel signals stored in the row memory 4 are respectively read out through readout switches 14 sequentially in the order in which readout pulses S1 to S6 are output from the horizontal shift resistor 5, and output from the output amplifier 7 via the output signal line 6. Signals input in the external circuit 9 from the output amplifier 7 are switched for each color by a color selection switch 11 and stored in the external memory 10. Then, image processing is performed.

Figure 8A:
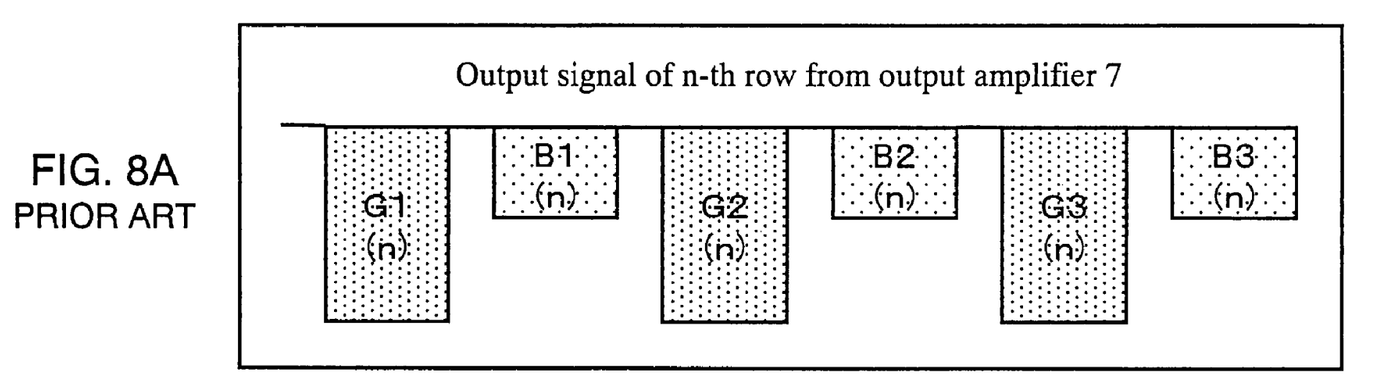
FIGS. 8A and 8B are views showing output waveforms in the output amplifier of the MOS type solid-state imaging device shown in FIG. 7.
Figure 8B:
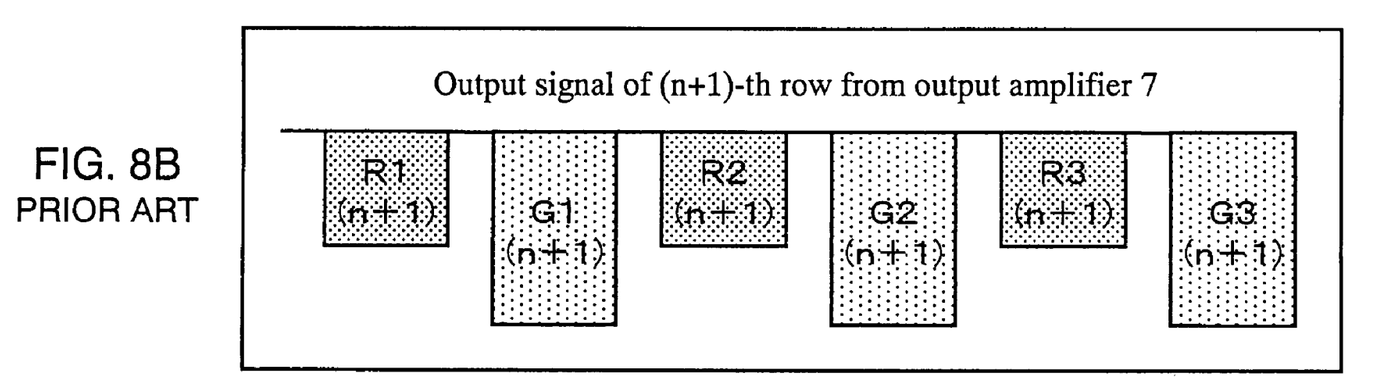

FIGS. 8A and 8B show output waveforms from the output amplifier 7 of the above-mentioned conventional MOS type solid-state imaging device. The pixel signals of the n-th row in the solid-state imaging device 8 shown in FIG. 7 are output as shown in FIG. 8A. According to sequential turning on of the readout pulses S1 to S6 from the horizontal signal transmission circuit 5, the signals of G2 (n), B (n), G2 (n), B (n), G2 (n) and B (n) are output in this order from the amplifier 7. Similarly, as shown in FIG. 8B, the output signals of the (n+1)-th row are output from the amplifier 7. The signals of R (n+1), G1 (n+1), R (n+1), G2 (n+1), R (n+1) and G1 (n+1) are output sequentially in this order. At this time, in the output signals from the output amplifier 7, pixel signals of different colors are adjacent to each other. Therefore, in the external circuit 9, it is necessary to sort output signals for each color by the color selection switch 11 at high speed so as to input them into the external memory 10 for each color. In the case of the configuration shown in FIG. 7, in order to transfer pixel signals of one row to the external memory 10, it is necessary to switch the color selection switch 11 six times. Therefore, with respect to pixel signals of one row of the n-th row and the (n+1) row, it is necessary to switch the color selection switches 11 twelve times.

Furthermore, since output signals tend to be influenced by the adjacent signal, colors may be mixed with each other, which may lead to a deterioration of the image quality. In particular, when the speed of outputting signals is increased, it is necessary to suppress the increase in the speed of the color signal selection switch 11 in the external circuit 9 and suppress the mixing of colors with each other.

SUMMARY OF THE INVENTION

It is an object of the present invention to provide a solid-state imaging device capable of suppressing the increase in the speed of a color selection switches of an external circuit and suppressing the mixing of colors.

The solid-state imaging device having a first configuration of the present invention includes: an imaging portion in which a plurality of pixels for photoelectrically converting incident light are arranged so as to form plural kinds of pixel lines having different color arrangements; a memory in which pixel signals obtained from the pixels of at least one line in the imaging portion are stored; an output signal line into which the pixel signals stored in the memory are read out; and an output portion from which signals of the output signal line are output. Pixel signals obtained from non-adjacent pixels of a first color in one line are read out into the output signal lines sequentially, and then pixel signals obtained from non-adjacent pixels of a second color are read out into the output signal lines sequentially.

The solid-state imaging device having a second configuration of the present invention includes: an imaging portion in which a plurality of pixels for photoelectrically converting incident light are arranged so as to form plural kinds of lines having different color arrangements; a memory in which pixel signals obtained from the pixels of at least one line in the imaging portion are stored; an output signal line into which the pixel signals stored in the memories are read out; and an output portion from which signals of the output signal line are output. Plural sets of the output signal lines and the output portions are provided. Pixel signals obtained from non-adjacent pixels of the same color in each line are read out from the memory sequentially for each color into different output signal lines respectively; and when reading out the pixel signals of the following line having a color arrangement that is different from the color arrangement of the preceding line from which the pixel signals have been read out, in the case where a pixel of the same color as the color included in the preceding line is included in the following line, a pixel signal of at least one pixel of the same color in the following line is read out into the same output signal line into which the pixel signals of the pixel of the same color in the preceding line are read out.

The solid-state imaging device having a third configuration of the present invention includes an imaging portion in which a plurality of pixels for photoelectrically converting incident light are arranged two-dimensionally so as to form at least one unit group of a plurality of pixel lines having respective different color arrangements; a memory in which pixel signals of at least one line in the imaging portion are stored; an output signal line into which pixel signals stored in the memory are read out; an output portion from which signals of the output signal line is output. Plural sets of the output signal lines and the output portions are provided; and the memory is connected to the output signal lines so that the pixel signals are read out into the respective signal lines from the respective storage positions of the memory. When the pixel signals of each line of each group are read out, pixel signals in each line are stored in the memory, and pixel signals obtained from non-adjacent pixels of the same color are read out sequentially into the different output signal lines respectively for each color. When reading out the pixel signals of the following line having a color arrangement that is different from the color arrangement of the preceding line from which the pixel signals have been read out, in the case where the pixel of the same color as the color in the preceding line is included in the following line, pixel signals of at least one pixel having the same color in the following line are stored in the memory in the same storage position in which pixel signals of the same color in the preceding line are stored, and then read out into output signal line.

In the present invention, the term "line" includes both row and column. That is to say, if each line in the above-mentioned configuration is set in a row direction or a column direction, the present invention can be applied with the similar effect.

DESCRIPTION OF THE PREFERRED EMBODIMENTS

According to the solid-state imaging device of the present invention, since pixel signals of the same color can be output sequentially, it is not necessary to carry out a switching operation of color selection switches for every pixel signal at high speed and the switching operation can be carried out at low speed, thus enabling signals to be output at high speed. Furthermore, it is possible to prevent adjacent colors from being mixed with each other.

The configuration as mentioned above may be such that pixel signals obtained from non-adjacent pixels of a first in the same line are read out into the output signal line sequentially, and then pixel signals obtained from non-adjacent pixels of a second color in the same line are read out into the output signal line sequentially. Thereby, since in the same row or same column, pixel signals of the same color can be output sequentially, it is possible to reduce the speed of the color selection switches for changing colors in the external circuit. The application of the configuration is easy even when the speed of outputting signals is increased. Furthermore, it is possible to suppress the colors from being mixed with each other.

Furthermore, it is preferable that when n kinds of colors of pixels are included in the same line, signals of all pixels of the same color are read out sequentially into the same output signal line for each color. Thereby, it is possible to reduce the speed of the color selection switches and to suppress the mixing of colors of adjacent signals, thus obtaining a high quality image.

Furthermore, it is preferable that a color of a pixel signal output lastly in the n-th line is the same as a color of a pixel signal output firstly in the (n+1)-th line. Thus, it is possible to further suppress the mixing of colors of adjacent signals, thus obtaining a high quality image.

Furthermore, it is preferable that when a color of the pixel signal output from the output portion is changed at the boundary between lines, at least one of the last pixel signal of the preceding line and the first pixel signal of the following line is excluded from the image data. Thus, when the colors of the pixel signals are changed, the pixel signal at the boundary portion between the preceding pixel signal and the following pixel signal is prevented from being influenced by each other's color, thus obtaining the high quality image.

According to a solid-state imaging device according to the second configuration of the present invention, in the same line of the solid-state imaging device, it is possible to read out different colors in parallel from the respective different output portions and so increase the speed of reading out of the signals. Furthermore, even if color arrangements in the respective lines are different from each other, in the case where there is the same color in the neighboring lines, it is possible to read out the same color from the same output portion. Therefore, switching operation of the color selection switches may be carried out at low speed, and signals can be output at high speed easily. Furthermore, since output signals of the same color are output sequentially in a certain period, it is possible to suppress the mixing of colors in the output signals so as to obtain a high quality image.

In the above-mentioned configuration, the solid-state imaging device may include the two sets of the output signal lines and the output portions. Pixel signals obtained from a plurality of non-adjacent pixels of a first color in a first line are output from a first of the output portions, and pixel signals obtained from a plurality of non-adjacent pixels of a second color that is different from the first color in the first line are output from the second of the output portions; and then when reading out the pixel signals of a second line having a different color arrangement from the arrangement of the first line, in the case where pixels of the first color are included in the second line, pixel signals of a plurality of non-adjacent pixels of the first color in the second line are read out sequentially into the first output signal line sequentially.

In the above-mentioned configuration, each of the pixel signals output from pixels of a different color in a same line are read out respectively into the output signal lines simultaneously, and then output from the output portion that is connected to the output signal lines.

According to the solid-state imaging device of a third configuration of the present invention, in the same line of the solid-state imaging device, it is possible to read out different colors in parallel from the different output portions respectively and so increase the speed of reading out of the signals. Furthermore, with respect to the pixel signals in each line having the different color arrangement, since pixel signals of the same color are read out through the same storage position of the memory, the same output signal line and the same output amplifier, high quality image can be obtained without being influenced by a characteristic variation of the row memory, the output signal lines and the output amplifier portion. Furthermore, since the pixel signals of the same color are output from the solid-stage imaging device sequentially, the switching operation of the external circuit for switching colors may be carried out at low speed, and the solid-state imaging device can be output at high speed. Furthermore, since adjacent pixel signals have the same color, mixing of colors due to the influence of the adjacent pixel signals can be suppressed, thus obtaining a high quality image.

In the above-mentioned configuration, the solid-state imaging device may include the two sets of the output signal lines and the output portions. The memory is connected to the respective output signal lines so that the pixel signals are read out into the respective signal lines from the respective storage positions of the memory. When reading out the pixel signals of each group, pixel signals in the first line are stored in the memory, pixel signals obtained from a plurality of non-adjacent pixels of a first color have been read out from the memory into a first output signal line sequentially, and pixel signals obtained from a plurality of non-adjacent pixels of a second color are read out from the memory into a second output signal line sequentially. When reading out the pixel signals of the second line having a color arrangement that is different from the color arrangement of the first line from which the pixel signals have been read out, in the case where the pixel of the same color as that of the first line is included in the second line, pixel signals of at least one pixel of the same color in the second line are stored in the memory in the same storage position in which the pixel signals of the same color in the first line are stored, and then read out into the output signal line.

Furthermore, pixel signals of all the pixels of the same color in one of the lines may be stored in the memory; read out into the output signal lines sequentially, and then pixel signals of all the pixels of the same color in a next line may be stored in the memory simultaneously.

It is possible to configure a camera or a camera system including the solid-state imaging device having any one of the above-mentioned configurations.

Hereinafter, the present invention will be described in more detail by way of embodiments with reference to drawings.

(Embodiment 1)

Figure 1:
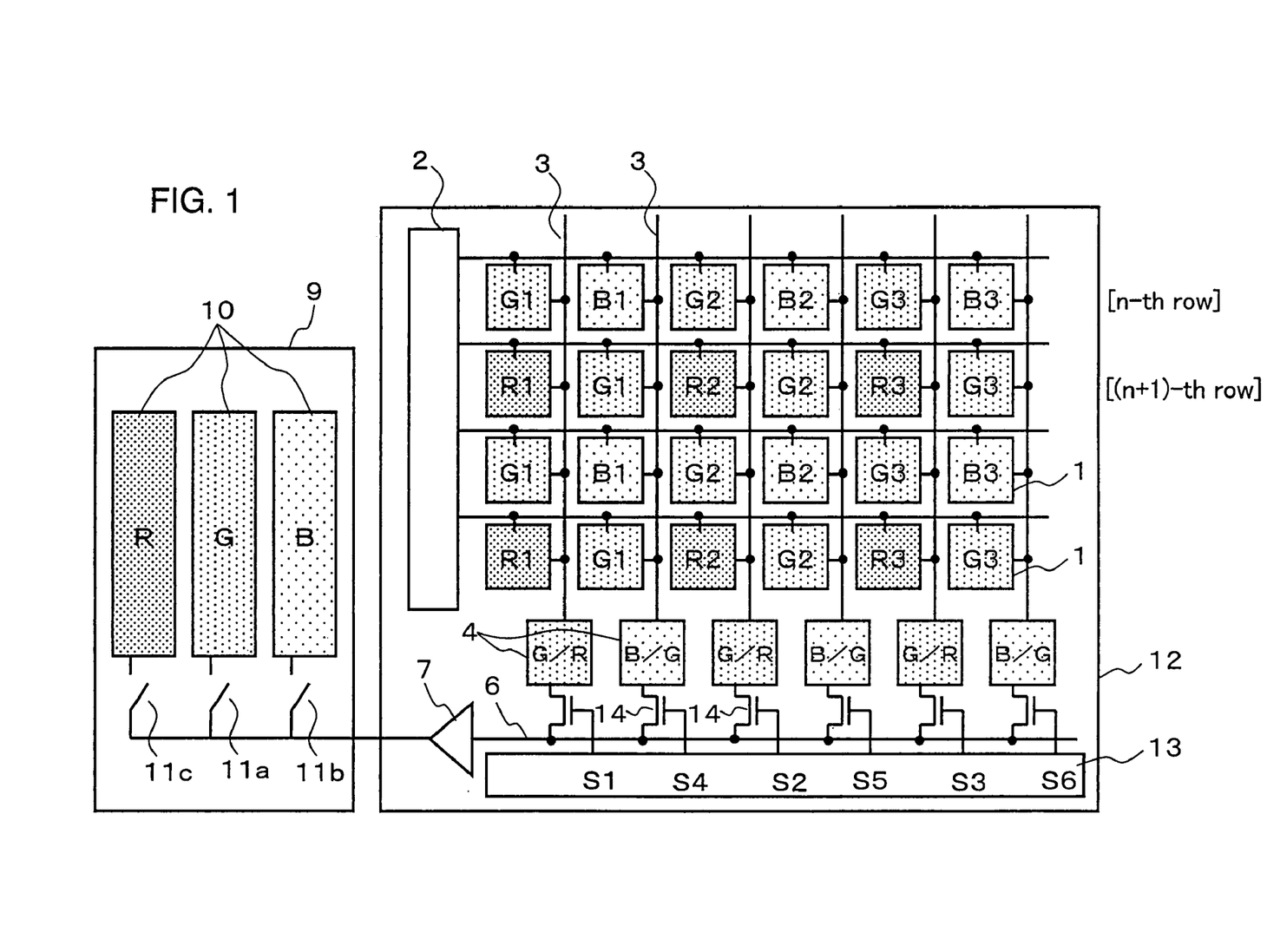
FIG. 1 is a view showing configurations of a MOS type solid-state imaging device and an external circuit according to Embodiment 1 of the present invention.

FIG. 1 shows configurations of a MOS type solid-state imaging device 12 and an external circuit 9 according to Embodiment 1 of the present invention. To the same elements as those of the conventional example shown in FIG. 7, the same reference numbers are given and the explanations therefor are not repeated herein.

The solid-state imaging device 12 has the same configuration as the conventional device shown in FIG. 7 except for a configuration of a horizontal shift resistor 13. The configuration of the external circuit 9 is the same as that of the conventional example shown in FIG. 7. Pixels 1 in the solid-state imaging device 12 are arranged in a Bayer arrangement of three primary colors, red (R), green (G) and blue (B), which is the same configuration as in the conventional example. The difference between the horizontal shift resistor 13 of this Embodiment and that of the conventional example is in the following operations when pixel signals of the pixel 1 of each row are read out into an output signal line 6.

When signals of the pixels 1 of each row are read out into the output signal line 6, first of all, pixel signals of the pixels 1 in each row are read out into vertical signal lines 3 by a vertical shift resistor 2 and transferred to row memory 4. Thereafter, readout pulses S1, S2 and S3 are supplied from the horizontal shift resistor 13 to a readout switch 14 sequentially. However, as shown in FIG. 1, the readout pulses S2 and S3 are supplied to every other readout switch 14. Thus, all signals of the same color, for example, green (G) with respect to the n-th row, are read out into the output signal line 6. Then, similarly, with readout pulses S4, S5 and S6, all signals of another color, for example, blue (B) with respect to the n-th row, are read out into the output signal line 6. All of the pixel signals thus read out are output from an output amplifier 7.

The signals output from the output amplifier 7 are input into the external circuit 9 and stored in the respective external memories 10 for each color by the switching operation of color selection switches 11a, 11b and 11c. For example, when pixel signals in the n-th row in FIG. 1 are read out, first of all, a color selection switch 11a for green (G) is turned on; all the output signals of green (G) are read out with the readout pulses S1, S2 and S3 into the position of the external memory 10 of green (G); and then the color selection switch 11a is turned off. Then, the color selection switch 11b for blue (B) is turned on, and all output signals of blue (B) are read out with the readout pulses S4, S5 and S6 into the position of blue (B) of the external memory 10. Thus, the color selection switches 11a and 11b are operated only twice, that is, the operations are carried out only when the kinds of colors are changed. As compared with a conventional example in which it is necessary to change colors six times according to each pixel in each row, the number of operations can be reduced significantly.

Figure 2A:
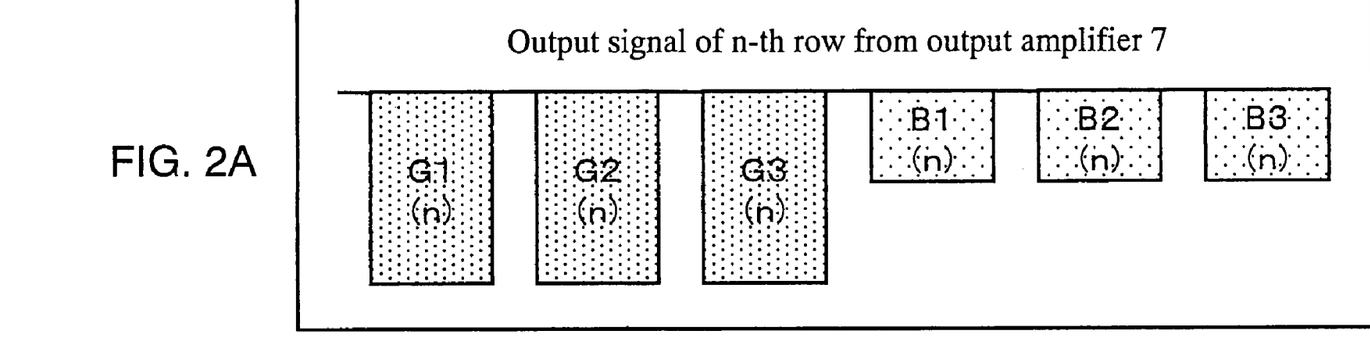
FIGS. 2A and 2B are views showing output waveforms in the output amplifier of the MOS type solid-state imaging device shown in FIG. 1.
Figure 2B:
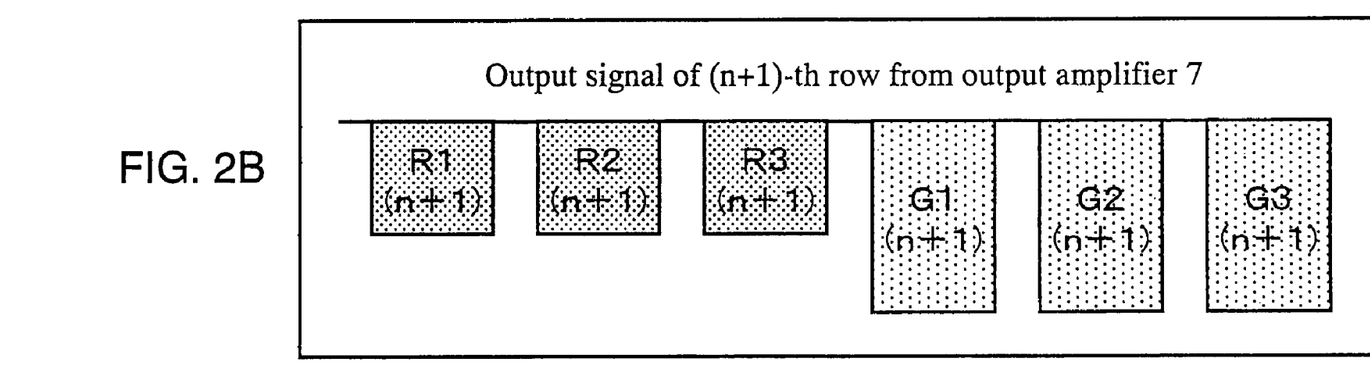

FIGS. 2A and 2B show output waveforms in the output amplifier 7 of the MOS type solid-state imaging device 12 in this embodiment. When pixel signals obtained from the arrangement of pixels 1 shown in FIG. 1 are processed, as shown in FIG. 2A, signals G1 (n), G2 (n), G3 (n), B1 (n), B2 (n), and B3 (n) are output in this order as the pixel signals in the n-th row. Furthermore, as shown in FIG. 2B, signals R1 (n+1), R2 (n+1), R3 (n+1), G1 (n+1), G2 (n+1), and G3 (n+1) are output in this order as the pixel signals in the (n+1)-th row. At this time, as signals from the output amplifier 7, signals of the same color obtained from non-adjacent pixels are output sequentially. Therefore, when the signals are stored in the external memories 10 of the external circuit 9, it is not necessary to operate color selection switches 11a, 11b, and 11c sequentially at high speed. That is to say, the switching operation may be carried out at low speed only at the time of switching colors, for example, at the time when colors are switched between red (R) and green (G).

Furthermore, since the signals of the same color are output from the output amplifier 7 sequentially and adjacent color signals are not influenced by each other, it is possible to prevent colors from being mixed with each other and to obtain a high quality image. In particular, when the speed of outputting signals is increased, the effect of improving an image quality becomes great by reducing the speed of the switching operation of the color selection switches 11a, 11b and 11c and by preventing colors from being mixed with each other.

Furthermore, in this embodiment, the last color of the (n+1)-th row is green (G), which is set to be the same color as the first color of the (n+2)-th row. Therefore, in the boundary portion between these rows, it is not necessary to switch the color selection switch 11a of green (G), and so this embodiment is further advantageous in increasing the speed.

Furthermore, when consecutive pixel signals are switched from one color to another color, the last pixel signal of the preceding color and the first pixel signal of another color are influenced by the different color. Therefore, it is desirable that at least one of these two pixel signals are not used for an image in order to maintain the high quality image.

(Embodiment 2)

Figure 3:
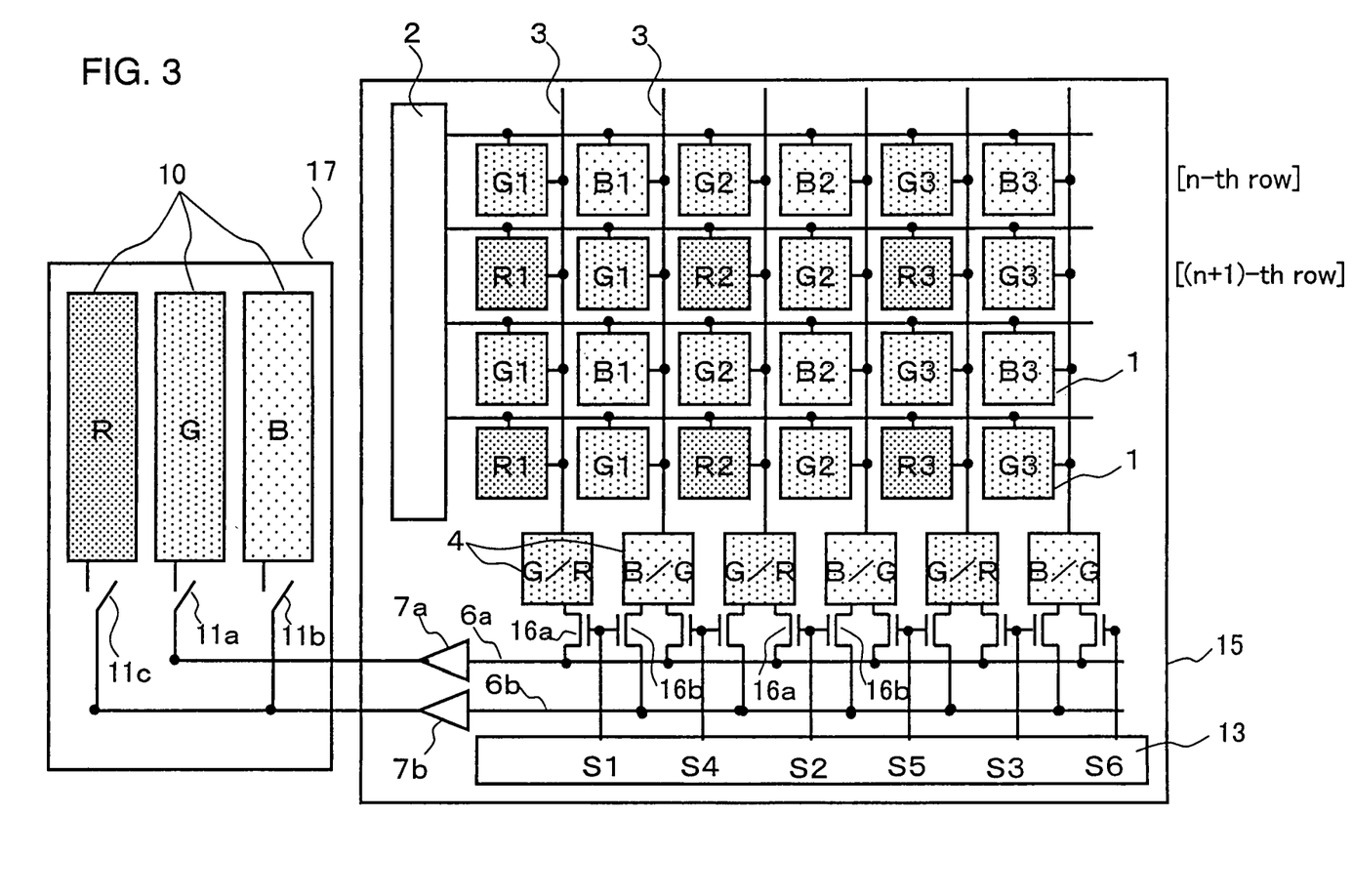
FIG. 3 is a view showing configurations of a MOS type solid-state imaging device and an external circuit according to Embodiment 2 of the present invention.

FIG. 3 shows a configuration of a MOS type solid-state imaging device 15 and an external circuit 17 according to Embodiment 2 of the preset invention. To the same elements as those of the conventional example shown in FIG. 7, the same reference numbers are given and the explanations therefor are not repeated herein.

The configuration of this solid-state imaging device 15 is different from that of a conventional device shown in FIG. 7 in that two output signal lines 6a and 6b are provided. With respect to the output signal lines 6a and 6b, output amplifiers 7a and 7b are connected, respectively. Between the row memory 4 and the output signal lines 6a and 6b, readout switches 16a and 16b are inserted. Furthermore, in the external circuit 17, color selection switches 11a to 11c are connected in accordance with the grouping corresponding to the output signals from the output amplifiers 7a and 7b.

The pixels 1 are arranged in a Bayer arrangement of primary colors of red (R), green (G) and blue (B) as in the conventional example. Pixel signals stored in the row memory 4 are read out so that they are assigned respectively to the two output signal lines 6a and 6b. Therefore, the row memory 4 is connected to the output signal line 6a via the readout switch 16a and connected to the output signal line 6b via the readout switch 16b. The adjacent readout switches 16a and 16b form a pair. Each pair of the readout switches 16a and 16b is supplied with readout pulses S1 to S6 output from the horizontal shift resistor 13.

In this embodiment, the operation in which signals from the pixels 1 of each row are read out into the signal lines 6a and 6b will be explained as follows. A certain row of the pixel signals are read out into the vertical signal line 3 by the vertical shift resistor 2 and transferred to the row memory 4. Thereafter, the readout pulses S1 to S3 are supplied sequentially from the horizontal shift resistor 13 to the readout switches 16a and 16b. However, the pairs of readout switches 16a and 16b to which the readout pulses S2 and S3 are supplied are selected as every other pair as shown in FIG. 3. For each readout pulse S1 to S3, the adjacent pixel signals of different colors in the same row stored in the row memory 4 are read out into the respective output signal lines 6a and 6b simultaneously. Therefore, to the respective output signal lines 6a and 6b, pixel signals of the respective same colors are read out for each of the pulses S1 to S3.

Then, pixel signals of the next row are read out into the vertical signal line 3 by the vertical shift resistor 2 and transferred to the row memory 4. Thereafter, the readout pulses S4 to S6 are supplied sequentially from the horizontal shift resistor 13 to the pair of the readout switches 16a and 16b. For each of the readout pulses S4 to S6, the adjacent pixel signals of different colors in the same row stored in the row memory 4 are read out into the respective output signal lines 6a and 6b simultaneously. However, in this case, the readout pulses S4 to S6 are supplied to the pair of the readout switches 16a and 16b to which the readout pulses S1 to S3 were not supplied. Therefore, the correspondence of the storage position in the row memory 4 and the output signal lines 6a and 6b is inverted. Thereby, all the signals of the pixels 1 of the same color (G) arranged in adjacent two rows are read out into the output signal line 6a.

For example, in the case of the arrangement of pixels shown in FIG. 3, after signals in the n-th row are transferred to the row memory 4, signals of the pixel 1 of green (G) are read out into the output signal line 6a, and signals of the pixel 1 of blue (B) are read out into the output signal line 6b with the readout pulses S1, S2 and S3. Then, after the signals in the (n+1)-th row are transferred to the row memory 4, signals of the pixels 1 of green (G) are read out into the output signal line 6a, and signals of the pixels 1 of red (R) are read out into the output signal line 6b with the readout pulses S4, S5 and S6. Therefore, to the output signal line 6a, signals of green (G) are always read out, and from the output amplifier 7a, signals of green (G) are always output. To the output signal line 6b, signals of blue (B) are read out in one row, and signals of red (R) are read out in the next row; and from the output amplifier 7b, signals of blue (B) and signals of red (R) are output in each row alternately.

Output signals from the output amplifiers 7a and 7b are input into the external circuit 17 and stored in the respective external memories 10 for each color via the switching operation of the color selection switches 11a, 11b and 11c. In this embodiment, as the output signals from the amplifier 7a, signals of green (G) are always output. Therefore, the color selection signal 11a into which signals from the output amplifier 7a are input can always be turned on, and a switching operation is not required. In the case of the output signals from the amplifier 7b, in a case of one certain row, the color selection switch 11b for blue (B) is turned on so as to read out all the output signals of blue (B) into the external memory 10 for blue (B); and in the next row, the color selection switch 11c for red (R) is turned on so as to read out all the output signals of red (R) into the external memory 10 for red (R). Therefore, it is sufficient that the color selection switches 11b and 11c are switched only at the time of switching rows.

Figure 4A:
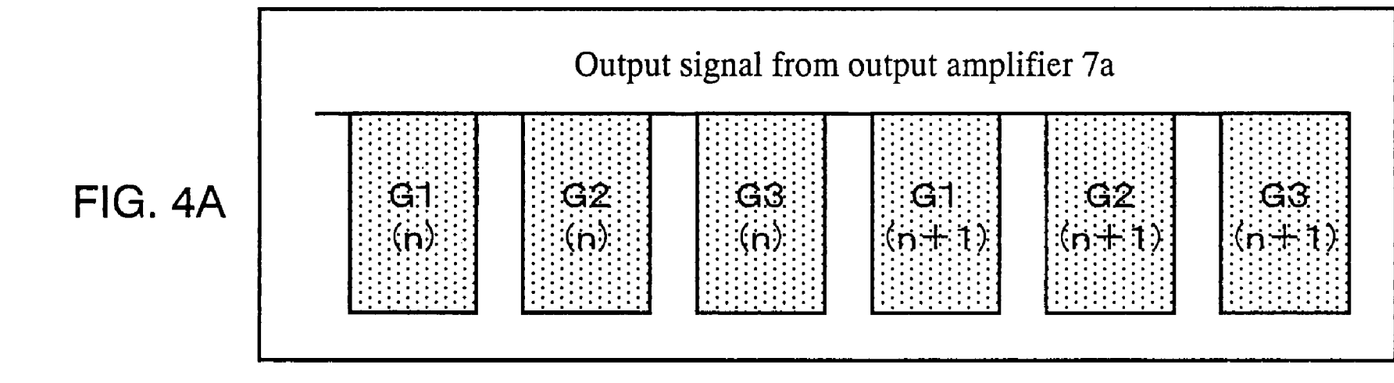
FIGS. 4A and 4B are views showing output waveforms in the output amplifier of the MOS type solid-state imaging device shown in FIG. 3.
Figure 4B:
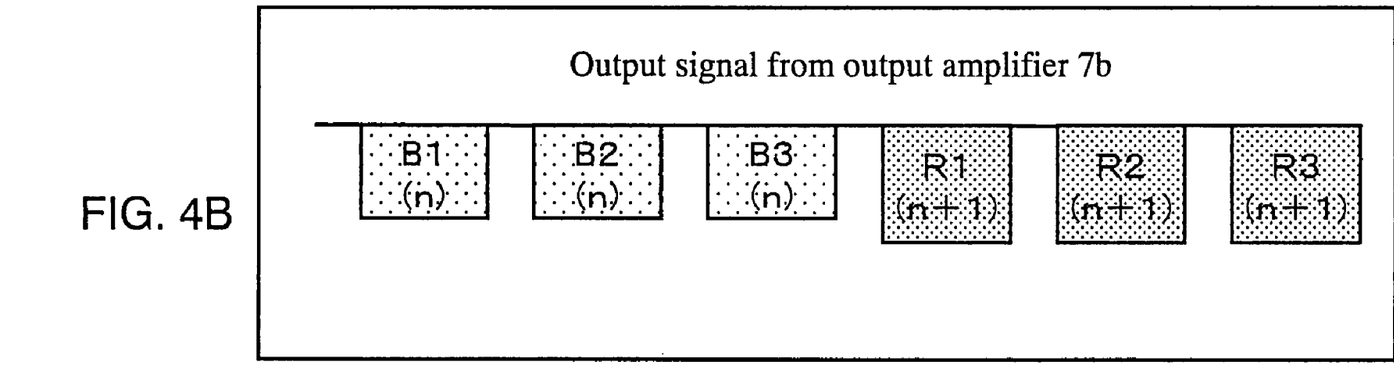

FIGS. 4A and 4B show output waveforms in the output amplifiers 7a and 7b of the MOS type solid-state imaging device 15 in this embodiment. In the case of the operation for processing pixel signals obtained from the pixels 1 in the arrangement shown in FIG. 3, as shown in FIG. 4A, signals G1 (n), G2 (n), G3 (n), G1 (n+1), G2 (n+1) and G3 (n+1) are output from the amplifier 7a as the pixel signals in the n-th row and the (n+1)-th row. As shown in FIG. 4B, signals B1 (n), B2 (n), B3 (n), R1 (n+1), R2 (n+1) and R3 (n+1) are output from the amplifier 7b. As respective output signals from the output amplifier 7a and 7b, signals of the same color from the non-adjacent pixels are output sequentially. Therefore, in the case where the signals are stored in the external memory 10 of the external circuit 17, it is not necessary to operate the color selection switches 11a to 11c sequentially at high speed. That is to say, as mentioned above, in the case of the output signals from the amplifier 7a, with respect to both the n-th row and the (n+1)-th row, the color selection switch 11a is not required to be switched. In the case of the amplifier 7b, the switching operation may be carried out only twice, i.e., at the time of switching of the n-th row and the (n+1)-th row.

Thus, in this embodiment, in order to read two rows of pixel signals, that is, the n-th and (n+1)-th rows of pixel signals, into the external memory 10, the number of switching operations of the color selection switches 11a to 11c may be twice. As compared with a conventional example in which the switching operation of color selection switches is required to be carried out twelve times, the switching operation of the color selection switches 11a to 11c can be carried out at low speed, and a speed of outputting signals can be increased.

Furthermore, signals of the same color are continued in the output signals, so that adjacent color signals are not influenced by each other. Thus, it is possible to prevent colors from being mixed with each other and to obtain a high quality image. In particular, when the speed of outputting signals is increased, the effect of improving an image quality obtained by the reduction of the switching speed of the color selection switches 11a, 11b and 11c and the suppression of color mixing becomes remarkable.

As mentioned above, according to this embodiment, in the external circuit 17, the color selection switches 11a to 11c are not required to be operated at high speed for every pixel signals and the switching operation may be carried out at low speed only at the time when the colors are changed. Furthermore, since signals are output in parallel, output can be carried out at high speed, and the speed of an entire camera system including the solid-state imaging device can be increased easily.

In this embodiment, two horizontal signal lines and output amplifiers are provided, and when three or more of horizontal signal lines and output amplifiers are provided, the effect of increasing the speed of the signal output, reducing the speed of the color selection switch and improving the quality of image is more remarkable.

(Embodiment 3)

Figure 5:
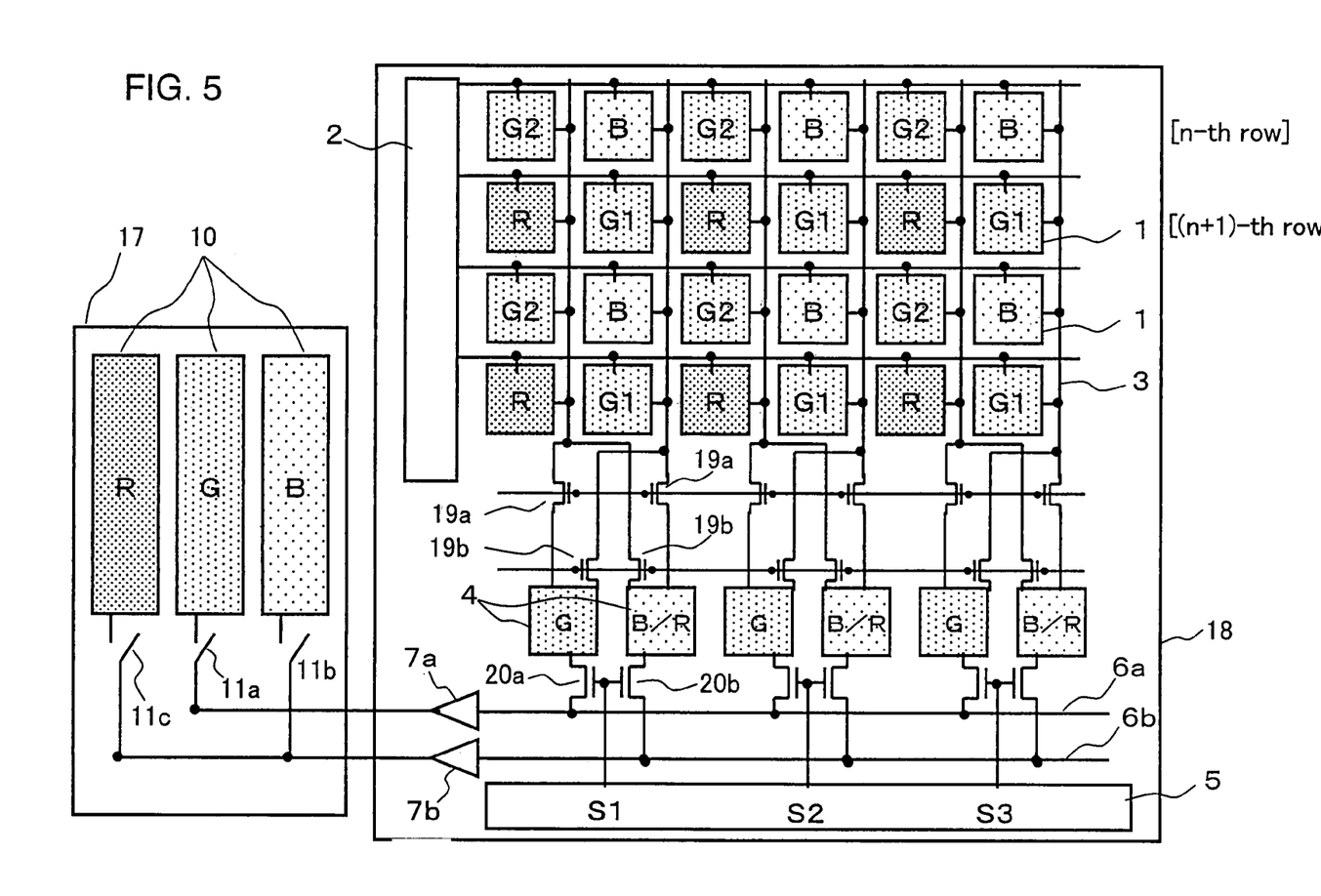
FIG. 5 is a view showing configurations of a MOS type solid-state imaging device and an external circuit according to Embodiment 3 of the present invention.

FIG. 5 shows a configuration of a MOS type solid-state imaging device 18 and an external circuit 17 according to Embodiment 3 of the present invention. To the same elements as those of the conventional example shown in FIG. 7, the same reference numbers are given and the explanations therefor are not repeated herein.

The configuration of this solid-state imaging device 18 is different from a conventional device shown in FIG. 7 in that two output signal lines 6a and 6b are provided. With respect to the output signal lines 6a and 6b, output amplifiers 7a and 7b are connected, respectively. Between a row memory 4 and output signal lines 6a and 6b, readout switches 20a and 20b are inserted. Furthermore, the vertical signal line 3 and the row memory 4, memory selection switches 19a and 19b are inserted. With the memory selection switches 19a and 19b, a connection of each vertical signal line 3 is switched between a storage position (G) and a storage position (B/R) in the row memory 4. In the external circuit 17, color selection switches 11a to 11c are connected in accordance with the grouping corresponding to the output signals from the output amplifiers 7a and 7b.

The pixels 1 are arranged in a Bayer arrangement of primary colors of red (R), green (G) and blue (B) as in the conventional example. Pixel signals stored in the row memory 4 are read out so that they are assigned to two output signal lines 6a and 6b, respectively. Therefore, the storage position (G) of the row memory 4 is connected to the output signal line 6a via the readout switch 20a, and the storage position (B/R) is connected to the output signal line 6b via the readout switch 20b. The adjacent readout switches 20a and 20b form a pair. Each pair of the readout switches is supplied with readout pulses S1 to S3 output from a horizontal shift resistor 5, sequentially.

In this embodiment, the operation in which pixel signals of the pixel 1 of each row are read out into the signal lines 6a and 6b will be explained as follows. First of all, pixel signals of the n-th row are read out into the vertical signal line 3 by the vertical shift resistor 2. At this time, the memory selection switch 19a is turned on, and the memory selection switch 19b is turned off. Therefore, signals read out into the vertical signal line 3 are transferred to the respective storage position (G) or (B/R) of the memory 4 determined by the memory selection switch 19a. Then, by the readout pulses S1, S2 and S3 from the shift resistor 5, each pair of the readout switches 20a and 20b are sequentially turned on. Thus, in response to the readout pulses S1 to S3, adjacent pixel signals of different colors in the n-th row stored in the row memory 4 are read out into the output signal lines 6a and 6b for each color simultaneously. Therefore, pixel signals of the respective same colors are read out sequentially to the respective output signal lines 6a and 6b, for every set of the pulses S1 to S3.

Then, pixel signals of the (n+1)-th row are read out into the vertical signal line 3 by the vertical shift resistor 2. At this time, the memory selection switch 19a is turned off, and the memory selection switch 19b is turned on. Therefore, the connection relationship between the vertical signal line 3 and the storage position of the row memory 4 is inverted with respect to the case of the n-th row. Thus, color (G), which is common to the n-th row and the (n+1)-th row, is transferred to the same position in the same row memory 4. Then, each pair of the readout switches 20a and 20b is turned on sequentially by the readout pulses S21, S2, and S3. Thus, in response to the readout pulses S1 to S3, adjacent pixel signals of different colors in the (n+1)-th row stored in the row memory 4 are read out for each color into the output signal lines 6a and 6b simultaneously. Therefore, pixel signals of the respective same color are consequently read out to the respective output signal lines 6a and 6b for every set of the readout pulses S1 to S3. Furthermore, by switching the storage positions as mentioned above, signals of the common color (G) in the n-th row and the (n+1)-th row are read out sequentially into the output signal line 6a.

For example, in the case of the arrangement of pixels shown in FIG. 5, as to the pixel signals of n-th row, the memory selection switch 19a is turned on, and signals of green (G2) are transferred to the storage position (G) in the row memory 4 and signals of blue (B) are transferred to the storage position (B/R) in the row memory 4. Then, by the readout pulses S1, S2 and S3 from the shift resistor 5, signals of green (G2) are read out into the output signal line 6a and signals of blue (B) are read out into the output signal line 6b, and output from the amplifiers 7a and 7b, respectively. As to the pixel signals in the (n+1)-th row, the memory selection switch 19b is turned on, and signals of green (G1) that is the same color as green (G2) of the n-th row are transferred to the same storage position (G) in the row memory 4 and signals of red (R) are transferred to the storage position (B/R). Then, by output readout pulses S1, S2 and S3 from the horizontal shift resistor 5, signals of green (G1) are read out into the output signal line 6a, and signals of red (R) are read out into the output signal line 6b.

As a result, to the output signal line 6a, signals of green (G) are always read out, and from the output amplifier 7a, signals of green (G) are always read out. To the output signal line 6b, in the n-th row, signals of blue (B) are read out sequentially; in the (n+1)-th row, signals of red (R) are read out sequentially; and from the output amplifier 7b, signals of blue (B) and red (R) are output alternately for every other row.

As mentioned above, since signals of the same color obtained from the different rows are read out through the same storage position of the row memory 4, the same output signal lines, and the same output amplifier, high quality image can be obtained without being influenced by a characteristic variation of the row memory, the output signal lines and the output amplifier portion.

The output signals output from the output amplifiers 7a and 7b are input into the external circuit 17, switched for each color via the switching operation of the color selection switches 11a, 11b and 11c, and stored in the positions of the respective colors in the external memories 10. In this embodiment, first of all, in the case of the signals from the output amplifier 7a, since signals of green (G) are always output, the color selection signal 11a into which the signals from the output amplifier 7a are input can always be turned on, and a switching operation is not required. In the case of signals of the output amplifier 7b, in the n-th row, a color selection switch 11b of blue (B) is tuned on and all of the output signals of the blue (B) are read out into the position for blue (B) of the external memory 10. In the (n+1)-th row, the color selection signal 11c of red (R) is turned on and all of the output signals for red (R) are read out into the position of the red (R) of the external memory 10. Thus, the color selection switches 11b and 11c may be switched only at the time the rows are switched.

Figure 6A:
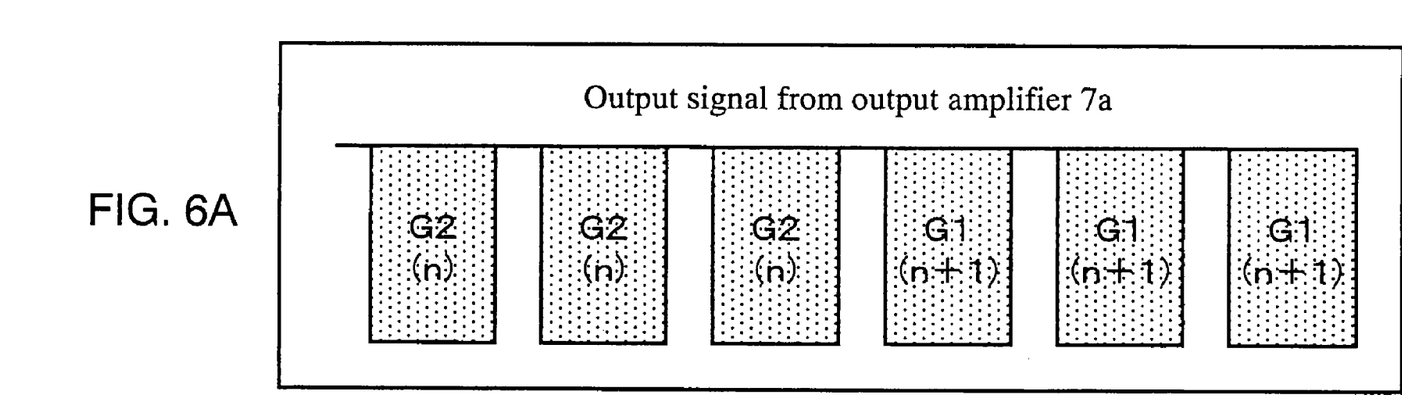
FIGS. 6A and 6B are views showing output waveforms in the output amplifier of the MOS type solid-state imaging device shown in FIG. 5.
Figure 6B:
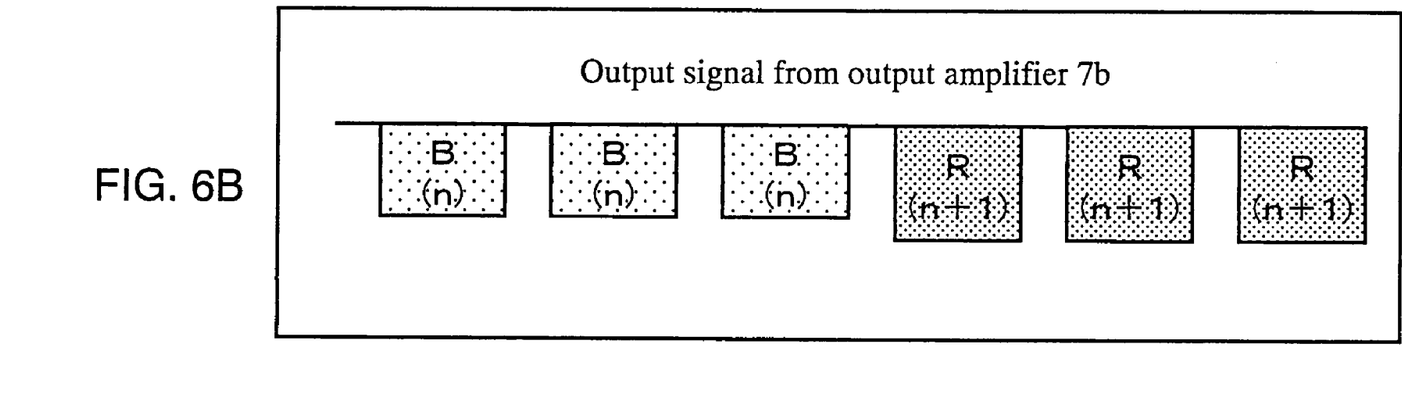

FIGS. 6A and 6B show output waveforms in the output amplifiers 7a and 7b of the MOS type solid-state imaging device 18 in this embodiment. In the pixel arrangement shown in FIG. 5, as shown in FIG. 6A, signals G2 (n), G2 (n), G2 (n), G1 (n+1), G1 (n+1) and G1 (n+1) are output sequentially from the amplifier 7a as the pixel signals in the n-th row and the (n+1)-th row. As shown in FIG. 6B, signals B (n), B (n), B (n), R (n+1), R (n+1) and R (n+1) are output sequentially from the amplifier 7b. Thus, as respective output signals from the output amplifiers 7a and 7b, non-adjacent signals of the same color are output sequentially.

As a result, as mentioned above, when pixel signals are stored in the external memory 10 of the external circuit 17, a switching operation of the color selection switch 11a is not necessary both in the n-th row and the (n+1)-th row. In the case of the signals from of the output amplifier 7b, a switching operation may be carried out only twice, that is, at the time of switching between the n-th row and the (n+1)-th row. Therefore, as compared with a conventional example in which the switching operation of color selection switches is required to be carried out twelve times, in this embodiment, the number of switching operations can be reduced to two. Thus, the switching operation of the color selection switches 11a, 11b and 11c can be carried out at low speed.

Furthermore, in the output signals, the same colors are continued, and so adjacent color signals are not influenced by each other, thus preventing colors from being mixed with each other. In particular, when the speed of outputting signals is increased, the effect of improving an image quality due to the reduction of the switching speed of the color selection switches 11a, 11b and 11c and the suppression of color mixing becomes remarkable.

In the embodiments mentioned above, the respective colors of each row are read out sequentially, and this case exhibits the most remarkable effect. However, in the case where at least two of the same color signals are output sequentially, it is possible to obtain the effect of increasing the speed of outputting signals, reducing the speed of the color selection switches and improving image quality.

Furthermore, not only in the case in which the signals of each row are read out into the output signal lines according to the embodiments as mentioned above, but also in the case where the signals of each column are read out into the output signal lines, the present invention can be applied.

Furthermore, not only in the case where an external memory is provided as an external circuit according to the embodiments as mentioned above, but also in the case where an external circuit is incorporated in the solid-state imaging device, the present invention can be applied.

In the above-mentioned embodiment, a color system of primary colors of R, G and B is used. However, the present invention is applicable when a color system of complementary colors such as cyan (Cy), magenta (Mg), yellow (Ye), green (G), etc. is used.

Furthermore, in the embodiments mentioned above, an optically black pixel (optical black) is not shown. However, the present invention is applicable even in a case in which a region of an optically black pixel is present in the vicinity of or inside the imaging portion, and the signals of the optically black pixels other than the color signals are read out.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A solid-state imaging device, comprising:
   an imaging portion in which a plurality of pixels for photoelectrically converting incident light are arranged so as to form a plural kinds of pixel lines having different color arrangements;
   a memory in which pixel signals obtained from the pixels of at least one line in the imaging portion are stored;
   an output signal line into which the pixel signals stored in the memory are read out; and
   an output portion from which signals of the output signal line are output;
   wherein pixel signals obtained from non-adjacent pixels of a first color in one line are read out into the output signal line sequentially, and then pixel signals obtained from non-adjacent pixels of d second color are read out into the output signal line sequentially, and
   when a color of the pixel signal output from the output portion is changed in the boundary between lines, at least one of the last pixel signal of the preceding line and the first pixel signal of the following line is excluded from the image data.

2. The solid-state imaging device according to claim 1, wherein pixel signals obtained from non-adjacent pixels of the same color in the same line are read out into the output signal line sequentially, and then pixel signals obtained from non-adjacent pixels of another color in the same line are read out into the output signal line sequentially.

3. The solid-state imaging device according to claim 1, wherein when n kinds of colors of pixels are included in a same line, signals of all pixels of the same color are read out sequentially into the same output signal line for each color sequentially.

4. The solid-state imaging device according to claim 2, wherein a color of a pixel signal output lastly in the n-th line is the same as a color of a pixel signal output firstly in the (n+1)-th line.

5. A camera comprising a solid-state imaging device according to claim 1.

* * * * *